US007034925B2

(12) United States Patent
Kamiyama et al.

(10) Patent No.: US 7,034,925 B2
(45) Date of Patent: Apr. 25, 2006

(54) ORIGINAL FEEDING DEVICE HAVING ORIGINAL SIZE INDICATOR

(75) Inventors: Nobuto Kamiyama, Ibaraki (JP); Tomohito Nakagawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 10/799,594

(22) Filed: Mar. 15, 2004

(65) Prior Publication Data

US 2004/0184022 A1 Sep. 23, 2004

(30) Foreign Application Priority Data

Mar. 19, 2003 (JP) ............................ 2003-075621

(51) Int. Cl.
*G03B 27/00* (2006.01)
*G03B 27/62* (2006.01)

(52) U.S. Cl. ........................................ 355/407; 355/75

(58) Field of Classification Search .................. 355/40, 355/72–76, 407; 271/121–123; 399/405
See application file for complete search history.

(56) References Cited

U.S. PATENT DOCUMENTS 5,455,667 A 10/1995 Hiroi et al. ................. 355/309
5,552,859 A 9/1996 Nakagawa et al. ......... 355/207
5,621,501 A 4/1997 Matsuo et al. ................ 355/75
5,716,046 A * 2/1998 Katamoto et al. ......... 271/3.08
5,812,280 A * 9/1998 Kwan-Bo ................... 358/406
5,833,230 A 11/1998 Nakagawa et al. ......... 271/121
2004/0056413 A1* 3/2004 Shirakura et al. ........... 271/145

FOREIGN PATENT DOCUMENTS

JP 6-144594 5/1994

* cited by examiner

*Primary Examiner*—Henry Hung Nguyen

(74) *Attorney, Agent, or Firm*—Fitzpatrick, Cella, Harper & Scinto

(57) ABSTRACT

An original feeding device for feeding a sheet-shaped original comprises an original loading tray for loading the original, a width direction aligning plates and for aligning the width direction of the original loaded on the original loading tray, and an original size indicator. The original size indicator is the scale for indication of an original size, and is disposed so that the original size indicated by the width direction aligning plate can be checked by any of a first view point from above for the original feeding device and a second view point having an equal height to the feeding device and also sidelongly fronting the same device.

12 Claims, 10 Drawing Sheets

ORIGINAL FEEDING DEVICE HAVING ORIGINAL SIZE INDICATOR

BACKGROUND OF THE INVENTION

1. Field of the Invention

The present invention relates to an original feeding device, which comprises a width direction aligning plate for an original having a predetermined size, and disposes an original size indicator for indicating an original size by aligning it with the width thereof.

2. Related Background Art

In a conventional original feeding device, in the event that an original is loaded, an original size is indicated by aligning a width direction aligning plate with an original size indicator provided on an original loading tray or sheet stack tray. Although the width direction aligning plate can easily and accurately decide its position by a size indicator for a user's eye looking down at the device, for example, it is not possible to check the original size indicator on the original loading tray upper surface from a low view point such as a posture of sitting on a wheelchair and the like, and it is difficult to decide the position of the width direction aligning plate.

Hence, the invention disclosed in Japanese Patent Application Laid-Open No. 6-144594, provides a device in which a size indicator needle moves according to the movement of the width direction aligning plate, and by indicating the original size indicator provided on the elevation portion of the original feeding device, the size of the sheet loaded on the original loading tray can be checked even from a low view point.

However, in the invention disclosed in Japanese Patent Application Laid-Open No. 6-144594, there has been a problem in that, though the original size indicator is provided on the elevation portion of the original feeding device so that the sheet size can be checked from the low view point, the view point from an upper part than the original feeding device is unable to check the sheet size and thus an accurate positioning of the width direction aligning plate cannot be attained. When a copying is started without the position accurately decided, there are sometimes the cases where the original is biased, and a trouble such as a jam, a damage of the original and the like occurs.

SUMMARY OF THE INVENTION

The present invention has been made in view of such problems, and the object of the invention is to provide an original feeding device, which can easily check a size of an original loaded on an original loading tray for a user of a high view point as well as a low view point for the original feeding device.

In order to achieve the object, the present invention provides an original feeding device characterized by the following constitution;

an original feeding device for feeding an original in the shape of a sheet, comprising:

a loading tray for loading the original;

an indicator member having a scale for indicating an original size; and an aligning member for aligning a width direction of the original loaded on the loading tray, and indicating the scale on the indicator member, wherein the indicator member is disposed such that the original size indicated by the aligning member can be checked from any of a first view point from above for the original feeding device and a second view point having an equal height to the original feeding device and also sidelongly fronting the same device.

The above and other objects, features, and advantages of the invention will become apparent from the following detailed description taken in conjunction with the accompanying drawings.

DETAILED DESCRIPTION OF THE PREFERRED EMBODIMENTS

Figure 1:
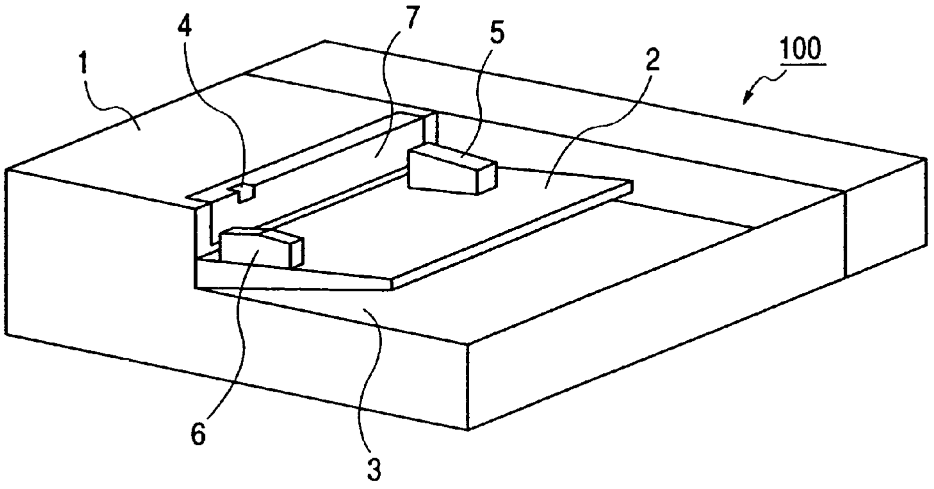
FIG. 1 PRIOR ART
FIG. 1 is a whole view of an original feeding device pertaining to a first embodiment.

The present invention will be described below based on the embodiments shown in the drawings.

First Embodiment

FIG. 1 is the whole view of an original feeding device 100 pertaining to a first embodiment. The original feeding device 100 shown in FIG. 1 is a publicly known device, comprising an original loading tray 2, a pair of width direction aligning plates 5 and 6 mounted thereon, and an original discharge tray 3, wherein the original loaded on the original loading tray 2 is conveyed in order from above and is discharged to the original discharge tray 3.

A device upper portion cover 1 is a cover of an original feeding device conveying portion, in which an original set LED 4 is disposed at an angular portion.

The original set LED 4 is an LED for advising a user that the original is accurately loaded on the original loading tray when the original is placed there and the original is detected. If the original is accurately loaded, the original set LED is turned ON. By disposing the original set LED 4 on the angular portion made by the upper surface and the side surface of the device cover 1, a light-on of the LED 4 is allowed to be checked not only from the view point from above, but also from the low view point from the side.

The original loaded on the original loading tray 2 is loaded on the center by the width direction aligning plates 5 and 6. The width direction aligning plate is made a pair by a rear member 5 and a front member 6, and depending on the original size, the position thereof is changed. Hence, when slid left and right, the width direction aligning plate is allowed to provide a feeling of clicking so that the width direction aligning plate is stopped at a predetermined position of the original size.

Figure 2:
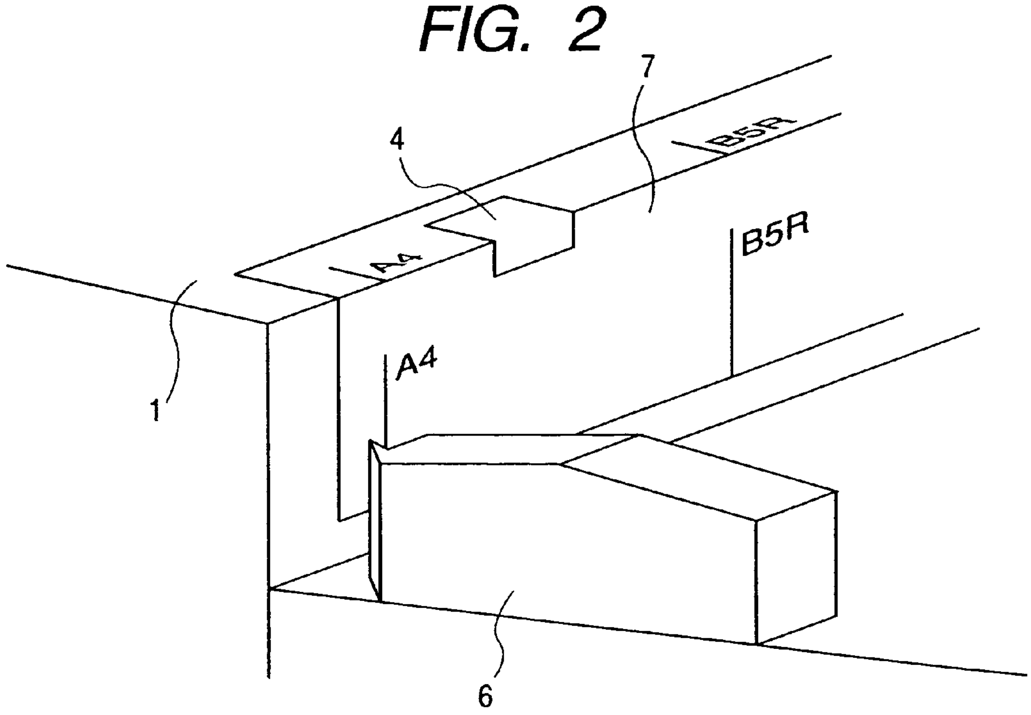
FIG. 2 is an enlarged view of a width direction aligning plate and its vicinity of the original feeding device pertaining to the first embodiment.

FIG. 2 is an enlarged view of the width direction aligning plate 6 and its vicinity. Since the width direction aligning plates 5 and 6 change their positions according to the original size when the original is loaded, they slide left and right. The width direction aligning plate 6 of the foreground side is made as low as possible in height so that a height as an original conveying guide and a visibility at a case of visual line being directed from a low position are compatible. An original size indicator 7 for aligning the position of the width direction aligning plate with the predetermined original size is disposed in an L letter shape from the device cover 1 upper surface to the side surface.

A top end of the width direction aligning plate is sharp, and is so shaped as to point to the original size indicator 7 from an oblique or sidelong direction, so that the top end of the width direction aligning plate points to the original size indicator 7 on the device upper cover 1 upper surface in case of the first view point from above for the device, and points to the original size indicator 7 on the cover side surface in case of the second view point having a substantially equal height to the device and also obliquely or sidelongly fronting the device.

Figure 3:
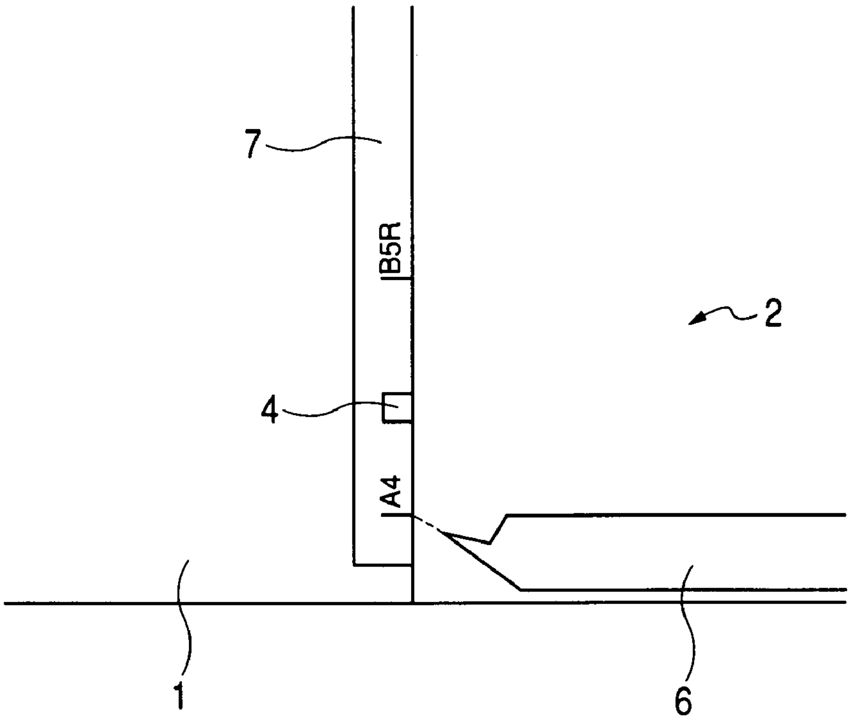
FIG. 3 is a view seen from above of original size indicator vicinity pertaining to the first embodiment.

FIG. 3 is a view seen from above of the original size indicator 7 vicinity. In the even that the original is loaded, in case of the view point from above the device, the top end of the width direction aligning plate 6 is allowed to point to one point on the upper surface side of the original size indicator 7 disposed in the L-letter shape on the side surface from the device upper portion cover 1 upper surface. By aligning the top end of the width direction aligning plate 6 with the original indicator, the width direction aligning plate 6 can be easily operated from the view point from above. The top end of the width direction aligning plate 6 is sharp, and is shaped so as to point to the original size indicator 7 from an oblique direction. Note that the L-letter shaped original size indicator 7 may be disposed by being divided into two that are for use of the view point from above and the view point from the side, respectively.

Figure 4:
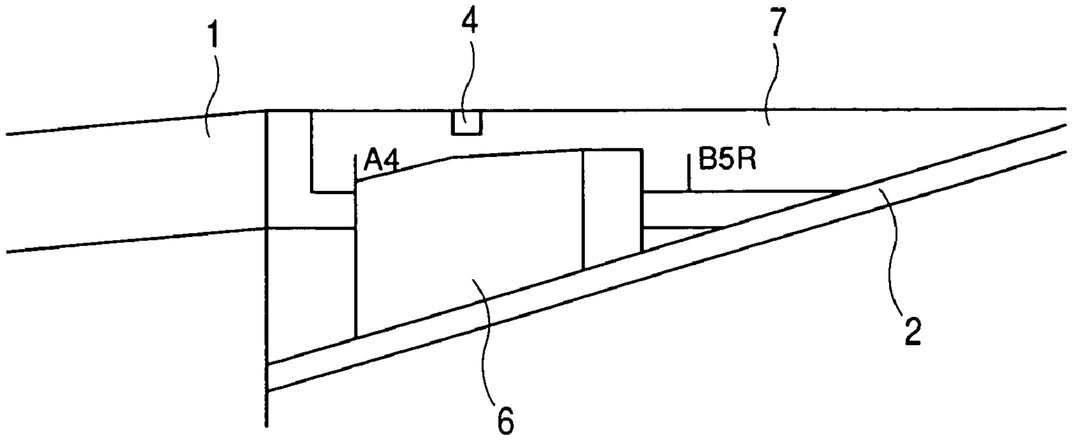
FIG. 4 is a view seen from the sidelong front for the original feeding device pertaining to the first embodiment.
Figure 5:
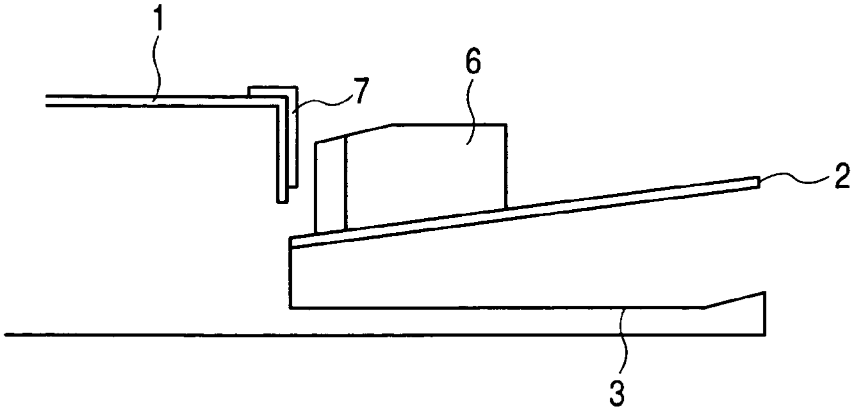
FIG. 5 is a view seen from the full front for the original feeding device pertaining to the first embodiment.

FIG. 4 is a view seen from the view point having a substantially equal height to the device and also obliquely or sidelongly fronting the device, and FIG. 5 is a view seen from the full (or direct) front for the device. In case of the view point from the full front, as shown in FIG. 5, with respect to the width direction aligning plate 6, only the side surface can be seen, but, as can be understood from FIG. 4, when the end portion of the width direction aligning plate 6 is slanted, and the point where two angular portions on the surface are joined together is aligned with the original size indicator 7 of the device upper portion cover 1 side surface, then the position of the width direction aligning plate 6 can be decided by the same original size indicator as the view point from above and also by the same point, thereby making the operation easily.

Second Embodiment

Figure 6:
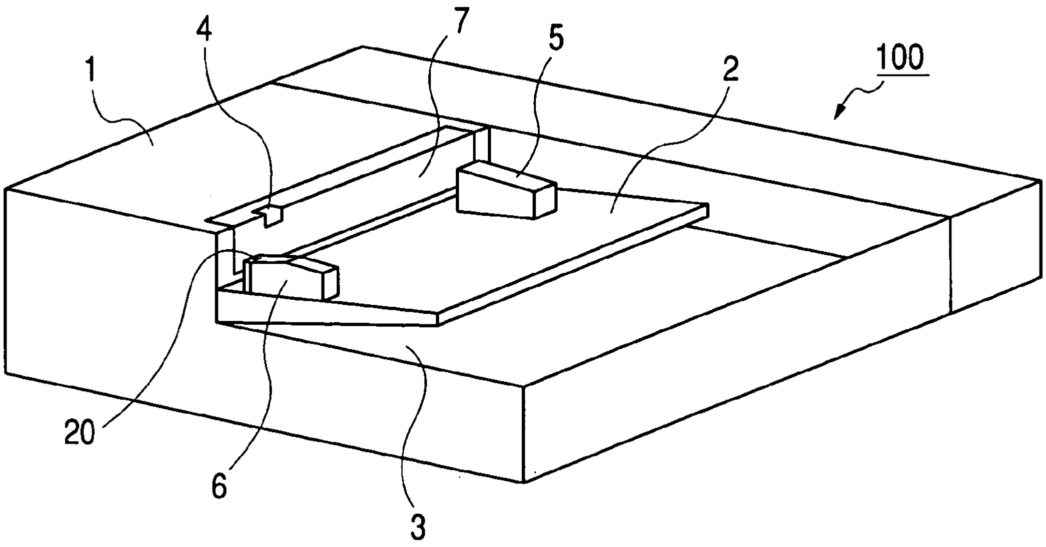
FIG. 6 is a whole view of the original feeding device pertaining to a second embodiment.
Figure 7:
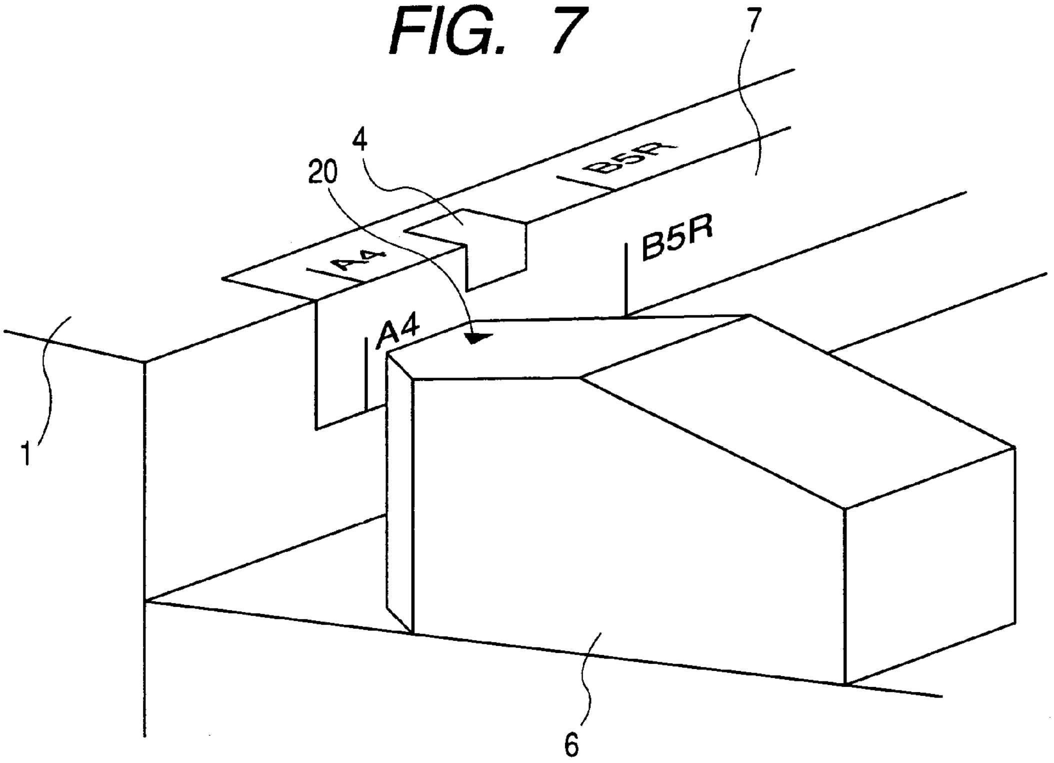
FIG. 7 is an enlarged view of the width direction aligning plate and its vicinity of the original feeding device pertaining to a second embodiment.

FIG. 6 is a whole view of an original feeding device 100 pertaining to a second embodiment, and FIG. 7 is an enlarged view of a width direction aligning plate 6 and its vicinity.

An original size indicator 7 is disposed in the L-letter shape on the side surface from a device upper portion cover 1 upper surface, and a triangular spot-faced arrow 20 showing the original size indicator 7 when viewed from the upper side, on the cover surface is disposed on the upper surface of the width direction aligning plate 6.

Figure 8:
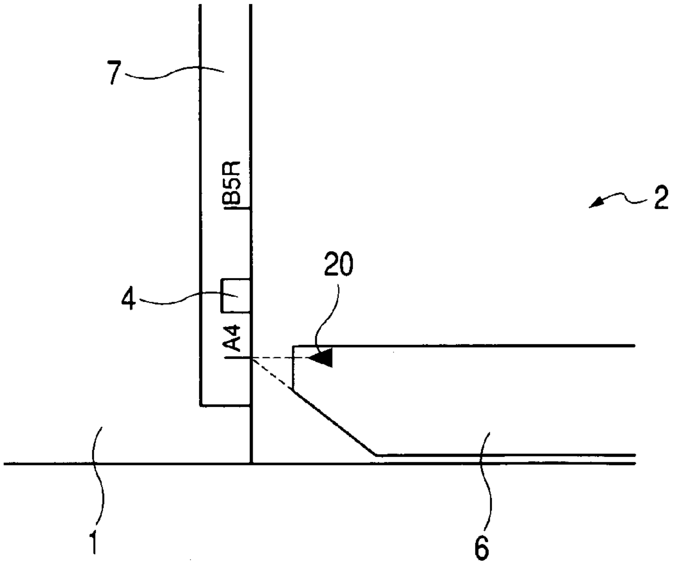
FIG. 8 is a view seen from above of the original size indicator vicinity pertaining to the second embodiment.

FIG. 8 is a view seen from above of the original size indicator 7 vicinity. In case of the view point from above the device, the triangular spot-faced arrow 20 disposed on the upper surface of the width direction aligning plate 6 is aligned with the original size indicator 7 of the device upper cover 1 upper surface side, so that it is possible to easily align the position of the width direction aligning plate 6 with the predetermined original size.

Figure 9:
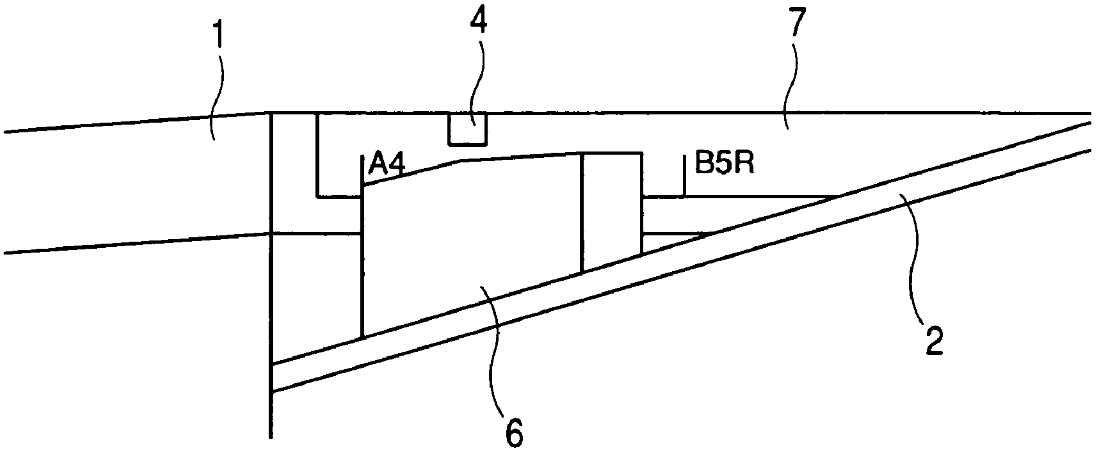
FIG. 9 is a view seen from the sidelong front for the original feeding device pertaining to the second embodiment.
Figure 10:
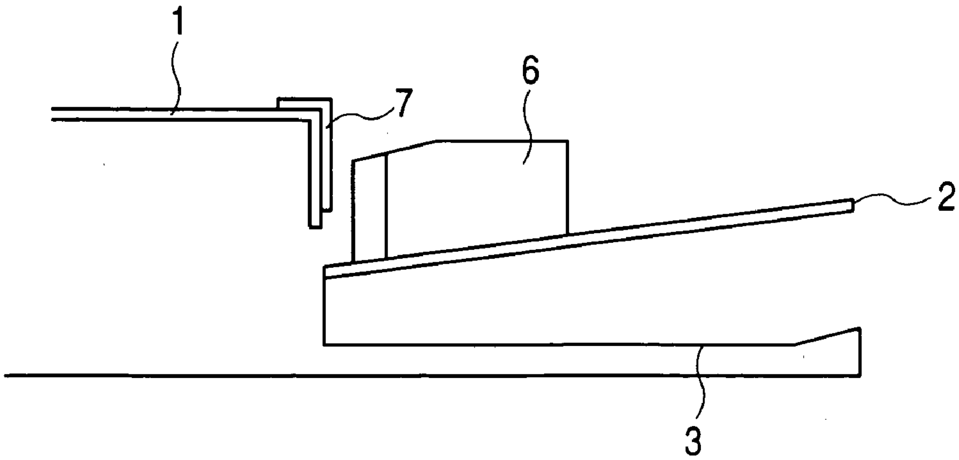
FIG. 10 is a view seen from the full front for the original feeding device pertaining to the second embodiment.

FIG. 9 is a view seen from the view point having a substantially equal height to the device and also obliquely or substantially fronting the device, and FIG. 10 is a view seen from the full (or direct) front for the device. In case of the view point from the full front, as shown in FIG. 10, with respect to the width direction aligning plate 6, only the side surface can be seen, but, in case of the view point from the sidelong or oblique front, as shown in FIG. 9, the point where two angular portions of the trapezoid shaped width direction aligning plate 6 are aligned is aligned with the original size indicator 7, as in the case where viewed from the upper side, so that the position of the width direction aligning plate 6 can be aligned with the predetermined original size. In this way, from both view points from above and the side also, the position can be aligned with the same point of the same original size indicator 7.

Note that, as with the first embodiment, even in the case where the L-letter shaped original size indicator 7 is divided into two that are for the upper surface and the side surface, respectively, the position of the width direction aligning plate 6 can be aligned by respective original size indicators.

Third Embodiment

Figure 11:
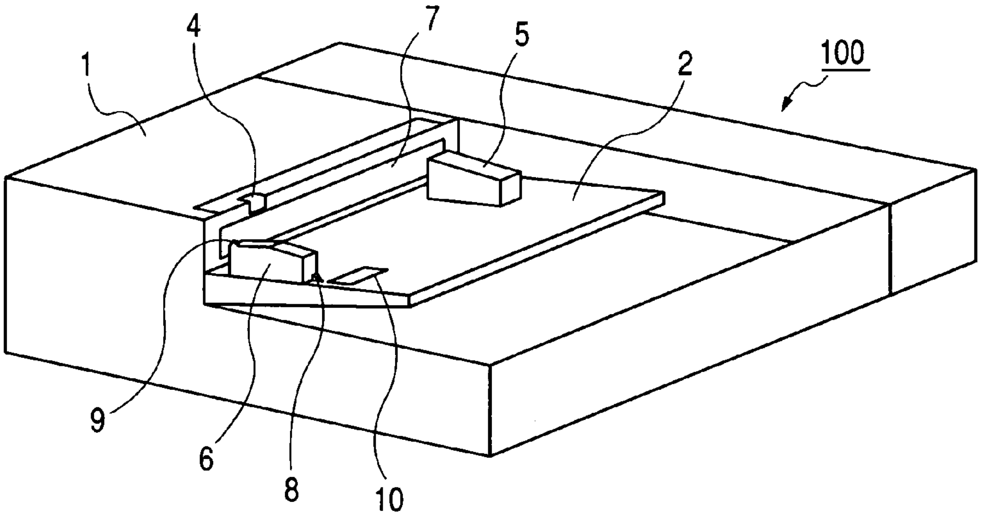
FIG. 11 is a whole view of the original feeding device pertaining to a third embodiment.
Figure 12:
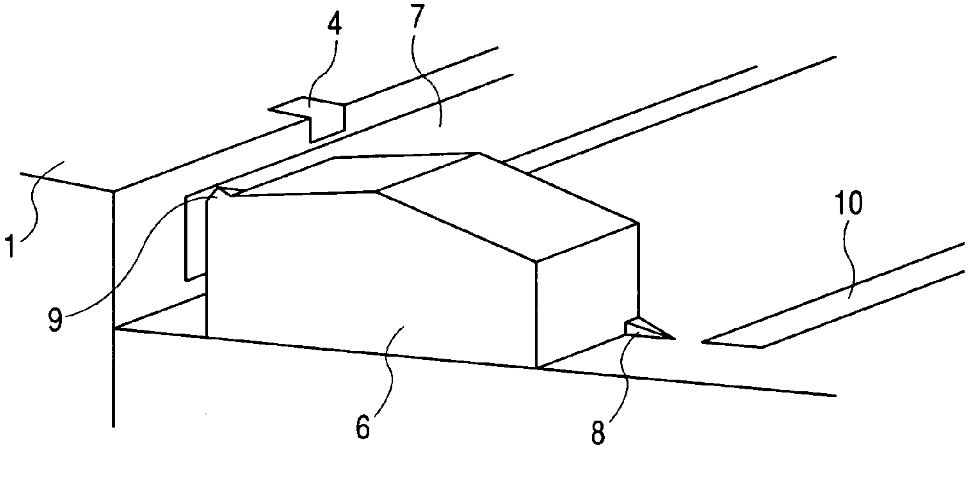
FIG. 12 is an enlarged view of the width direction aligning plate and its vicinity of the original feeding device pertaining to the third embodiment.

FIG. 11 is a whole view of an original feeding device 100 pertaining to a third embodiment, and FIG. 12 is an enlarged view of a width direction aligning plate 6 and its vicinity.

An original size indicator 10 is disposed on an original loading tray 2, and a protruded shape 8 showing the original size indicator 10 is disposed at the rear end of the width direction aligning plate 6. The original size indicator 7 is disposed on the device upper portion cover 1 side surface, and a protruded shape 9 showing the original size indicator 7 is provided on the tope end of the width direction aligning plate 6.

Figure 13:
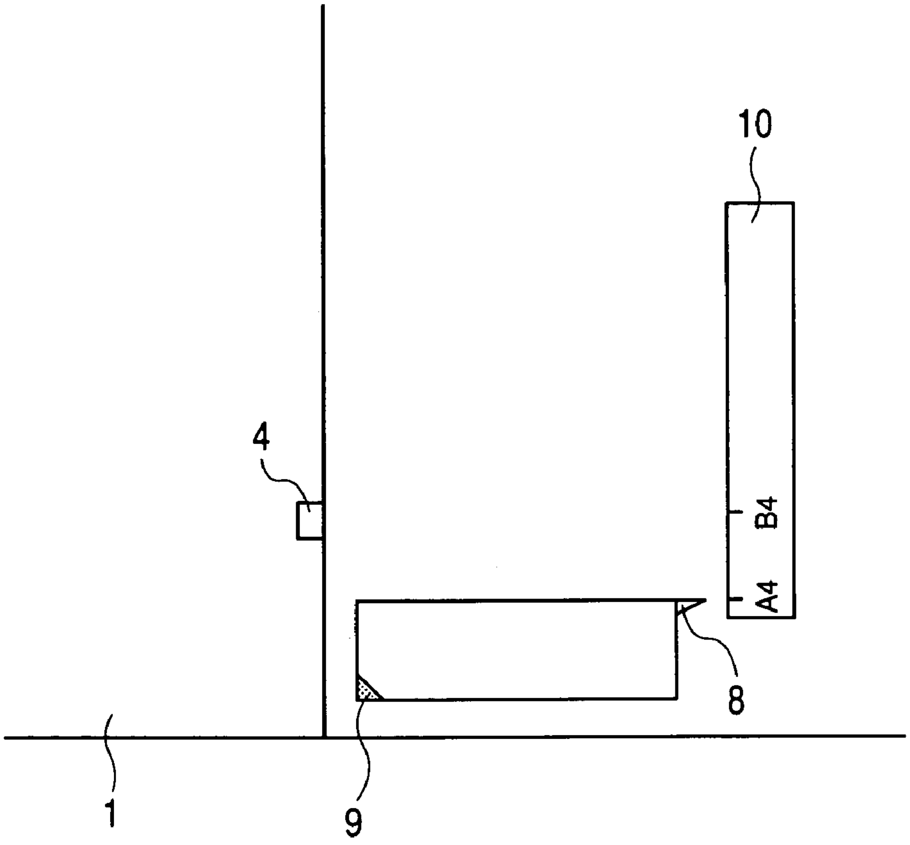
FIG. 13 is a view seen from above of the original size indicator vicinity pertaining to the third embodiment.

FIG. 13 is a view seen from above of original size indicator 10 vicinity. In case of a view point from above the device, the protruded shape 8 disposed at the rear end of the width direction aligning plate 6 is aligned with the original size indicator 10 on the original loading tray 2, so that the position of the width direction aligning plate 6 can be easily aligned with the predetermined original size.

Figure 14:
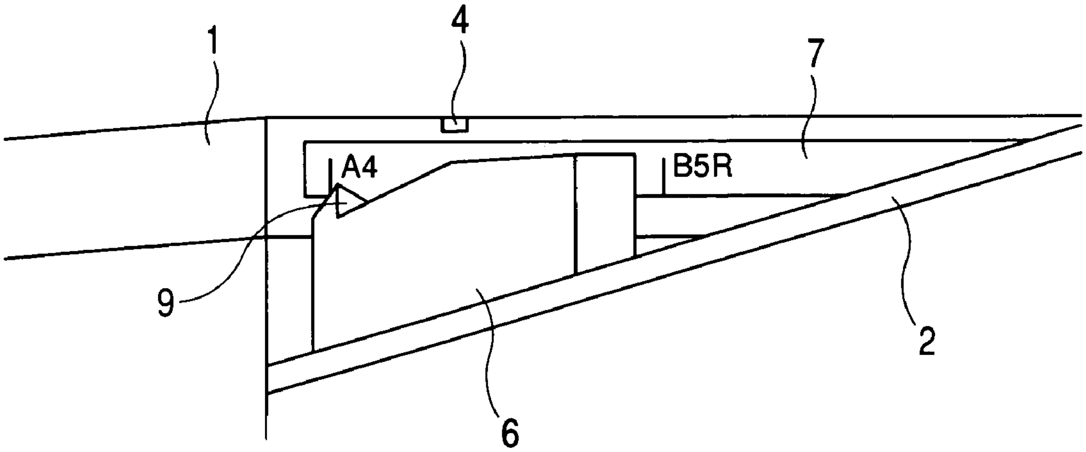
FIG. 14 is a view seen from the sidelong front for the original feeding device pertaining to the third embodiment.
Figure 15:
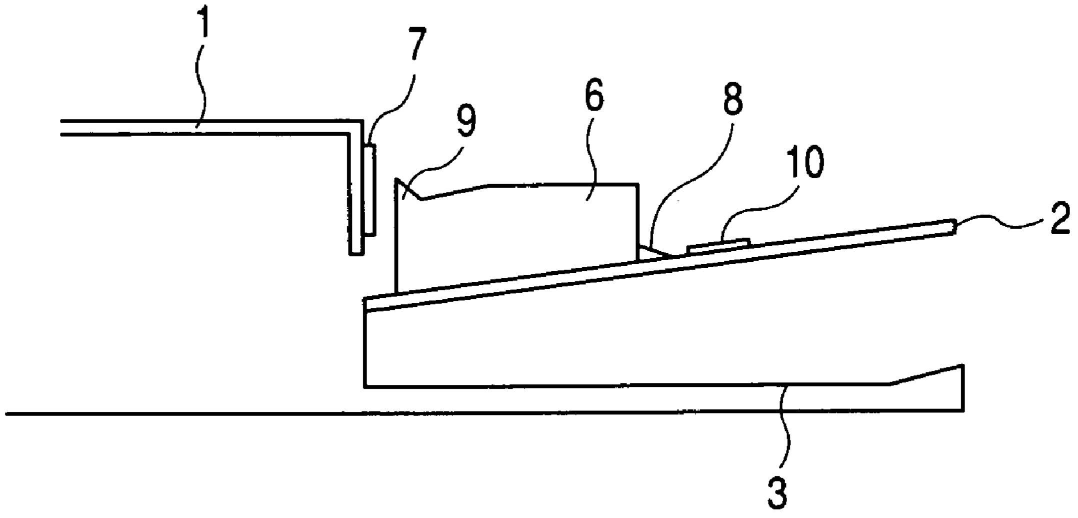
FIG. 15 is a view directly seen from the full front for the original feeding device pertaining to the third embodiment.

FIG. 14 is a view seen from the view point having a substantially equal height to the device and also obliquely or sidelongly fronting the device, and FIG. 15 is a view seen from the full (or direct) front for the device. In case of the view point from the full front, as shown in FIG. 15, with respect to the width direction aligning plate 6, only the side surface can be seen, but, in case of the view point from the sidelong or oblique front, as shown in FIG. 14, the protruded shape 9 of the top end of the width direction aligning plate 6 is aligned with the original size indicator 7 of the device cover 1 side surface, so that the position of the width direction aligning plate 6 can be aligned with the predetermined original size.

Two separate original size indicators seen from above and from the sidelong or oblique front are provided, and each indicator points to separate portions, so that the position of the width direction aligning plate 6 can be easily aligned from two view points from above and from the sidelong or oblique front.

Fourth Embodiment

Figure 16:
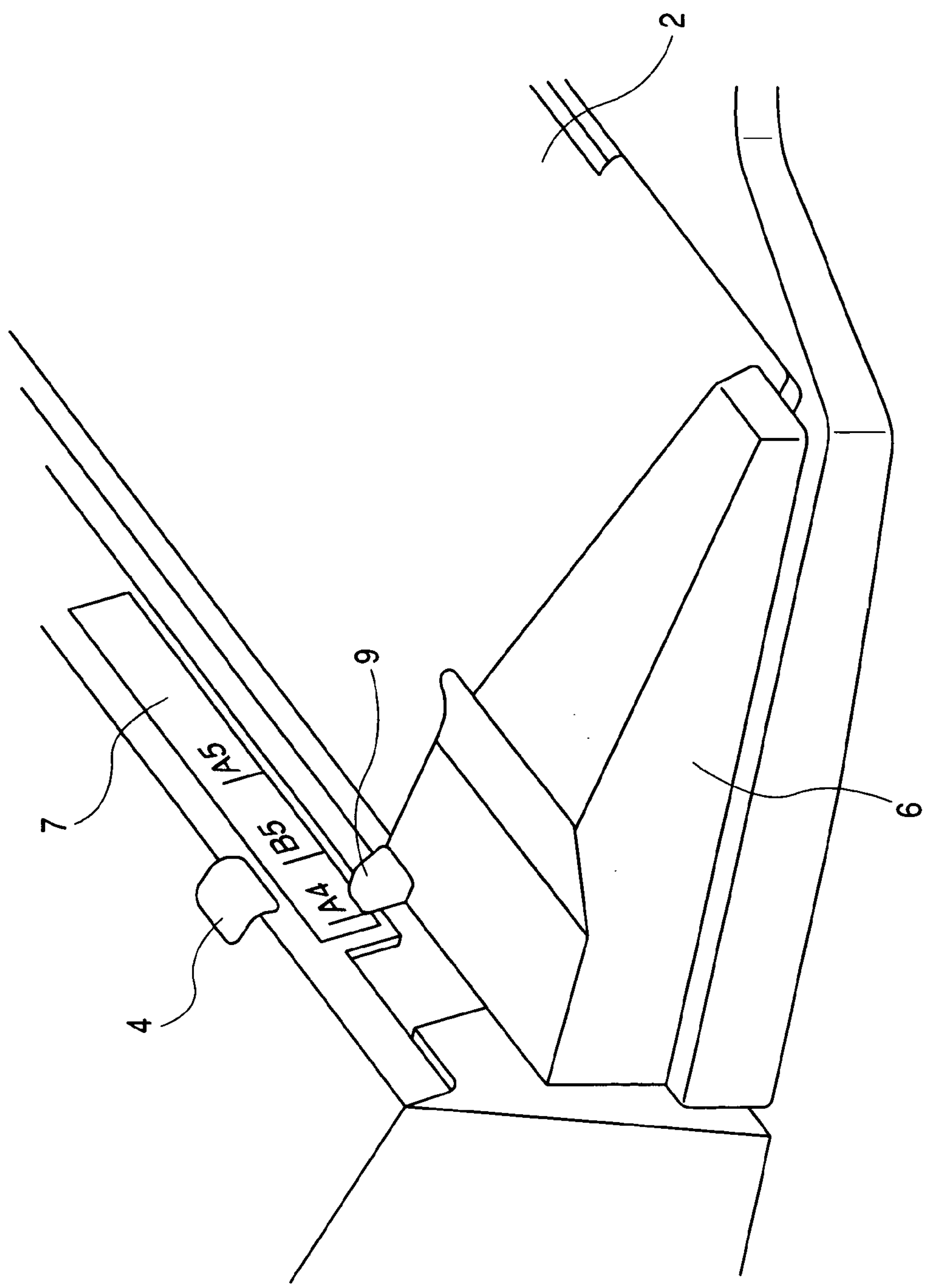
FIG. 16 is an enlarged view of the width direction aligning plate of the original feeding device and its vicinity pertaining to a fourth embodiment.
Figure 17:
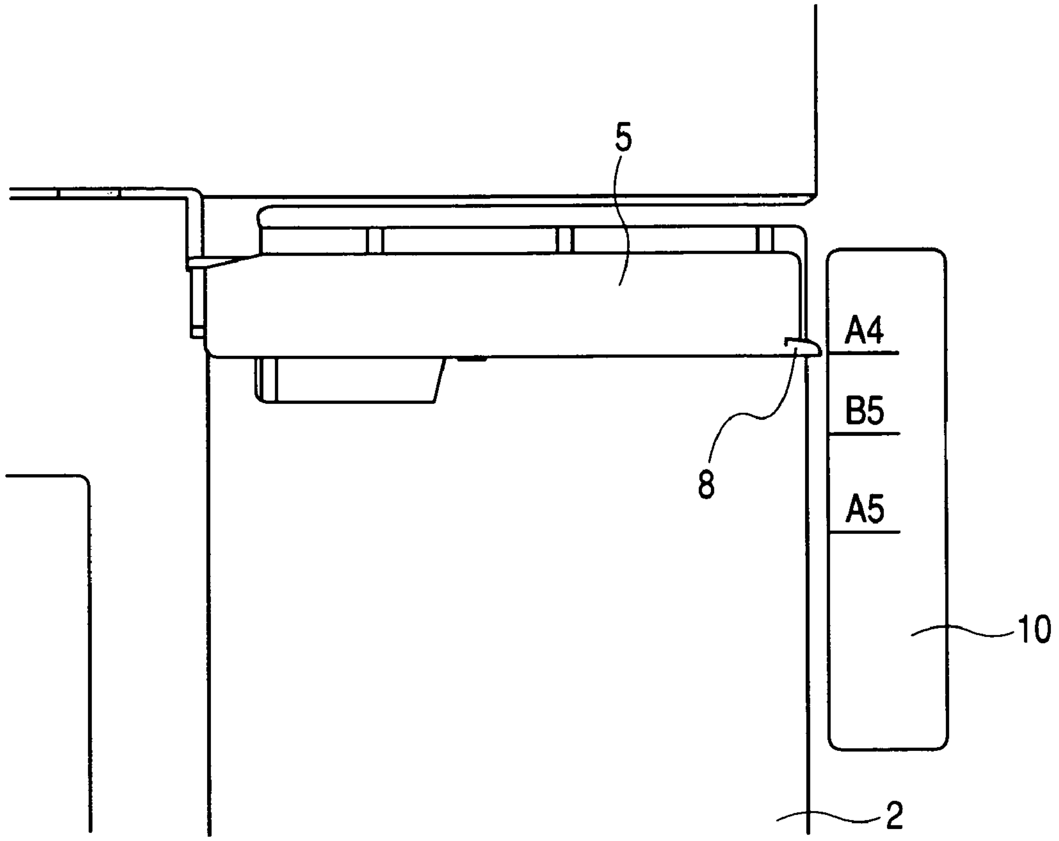
FIG. 17 is a view seen from above of the original size indicator vicinity pertaining to the fourth embodiment.

FIG. 16 is an enlarged view of a width direction aligning plate and its vicinity of an original feeding device 100 pertaining to a fourth embodiment, and FIG. 17 is a view seen from above of an original size indicator vicinity.

The fourth embodiment is different from the third embodiment in that a protruded shape 8 showing an original size indicator 10 is disposed at the rear end of a width direction aligning plate 5 at the rear side of the device. The original size indicator 7 is, as with the third embodiment, disposed at a device upper portion cover 1 upper portion, and a protruded shape 9 showing the original size indicator 7 is provided at the top end of a width direction aligning plate 6 of at the front side of the device.

In case of a view point from above the device, as shown in FIG. 17, the protruded shape 8 disposed at the top end of the rear width direction aligning plate 5 is aligned with an original size indicator 10 on an original loading tray 2, so that the position of the width direction aligning plate 5 can be easily aligned with the predetermined original size.

Further, in case of the view point having a substantially equal height to the device and also obliquely or sidelongly fronting the device, as shown in FIG. 16, the protruded shape 9 disposed at the top end of the front width direction aligning plate 6 is aligned with the original size indicator 7 of the device cover 1 side surface, so that the position of the width direction aligning plate 6 can be aligned with the predetermined original size.

Two separate original size indicators seen from above and from the sidelong or oblique front are provided, and each indicator points to separate portions so that the positions of the width direction aligning plates 5 and 6 can be easily aligned from two view points from above and from the sidelong or oblique front.

What is claimed is:

1. An original feeding device for feeding a sheet-shaped original, comprising:

a loading tray for loading the original;

a closable upper cover provided on the upper portion of said original feeding device;

an indicator member having a scale for indicating an original size; and an aligning member for aligning a width direction of the original loaded on said loading tray, and indicating the scale on said indicator member, wherein said indicator member is provided on each of said loading tray and said upper cover side surface, and wherein said aligning member is made a pair by the rear member and the front member relative to said original feeding device in order to align from both sides of the original width direction side, and the rear member of said aligning member comprises the protrusion for pointing to the scale of said indicator member provided on said loading tray upper surface, and the front member of the aligning member comprises the protrusion for pointing to the scale of said indicator provided on said upper cover side surface.

2. The original feeding device according to claim 1, wherein said indicator member is disposed in the shape of a bent L-letter from the upper surface to the side surface of said upper cover.

3. The original feeding device according to claim 2, wherein said indicator member comprises the scale for indicating the original size on each of the upper surface and the side surface of said upper cover.

4. The original feeding device according to claim 1, wherein said aligning member is made a pair of a rear member and a front member relative to said original feeding device so as to align from both sides of the original width direction, and the front member is made lower than the rear member.

5. The original feeding device according to claim 1, comprising light emitting means for advising, by emitting a light, that the original is accurately loaded on said loading tray, wherein said light emitting means is provided on an angler portion made by the upper surface and the side surface of said upper cover.

6. The original feeding device according to claim 1, wherein said aligning member clicks each time it is aligned with a predetermined original size.

7. The original feeding device according to claim 1, comprising a mark for indicating the scale of said indicator member on the upper surface of said aligning member.

8. The original feeding device according to claim 1, wherein said aligning member comprises a protrusion for pointing to the scale of said indicator member provided on said loading tray upper surface, and the protrusion for pointing to the scale of said indicator member provided on said upper cover side surface.

9. An original feeding device for feeding a sheet-shaped original, comprising:

a loading tray for loading the original;

an upper cover provided on the upper portion of said original feeding device;

a first indicator member provided on the upper surface of said loading tray, and having a scale for indicating an original size;

a second indicator member provided on the side surface of said upper cover, and having a scale for indicating an original size;

a first aligning member for aligning a width direction of the original loaded on said loading tray, and indicating the scale on said first indicator member, and a second aligning member for aligning a width direction of the original loaded on said loading tray, and indicating the scale on said second indicator member, wherein said first indicator member is disposed so as to be able to check the original size indicated by said first aligning member from a first view point from above for said original feeding device, and said second indicator member is disposed so as to be able to check the original size indicated by said second aligning member from a second view point at a height equal to said feeding device and also obliquely fronting the same device.

10. The original feeding device according to claim 9, wherein said first aligning member comprises the protrusion for pointing to the scale of said first indicator member, and said second aligning member comprises the protrusion for pointing to the scale of said second indicator member.

11. The original feeding device according to claim 9, wherein said second aligning member having a dent on said second indicator member side.

12. The original feeding device according to claim 9, wherein said first aligning member is made lower than said second aligning member.

* * * * *

UNITED STATES PATENT AND TRADEMARK OFFICE

CERTIFICATE OF CORRECTION

PATENT NO. : 7,034,925 B2 
APPLICATION NO. : 10/799594
DATED : April 25, 2006
INVENTOR(S) : Nobuto Kamiyama et al.

It is certified that error appears in the above-identified patent and that said Letters Patent is hereby corrected as shown below:

COLUMN 3:
Line 45, "even" should read --event--.

COLUMN 4:
Line 62, "tope" should read --top--.

COLUMN 6:
Line 35, "angler" should read --angular--.

Signed and Sealed this

Seventeenth Day of October, 2006

JON W. DUDAS
*Director of the United States Patent and Trademark Office*